May 12, 1970     O. W. OERMAN ET AL     3,511,316
HYDRAULIC MARKER FOR AGRICULTURAL IMPLEMENTS
Filed Jan. 5, 1967     2 Sheets-Sheet 2
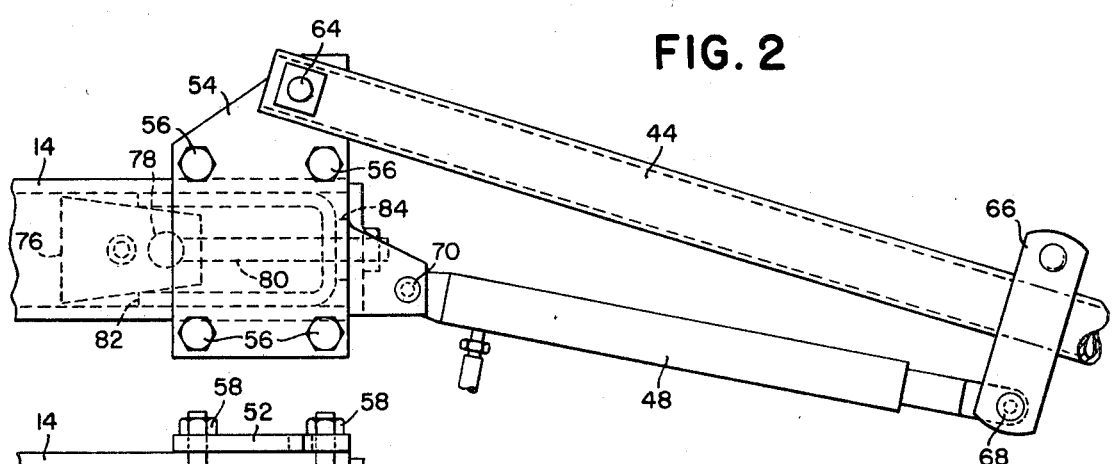
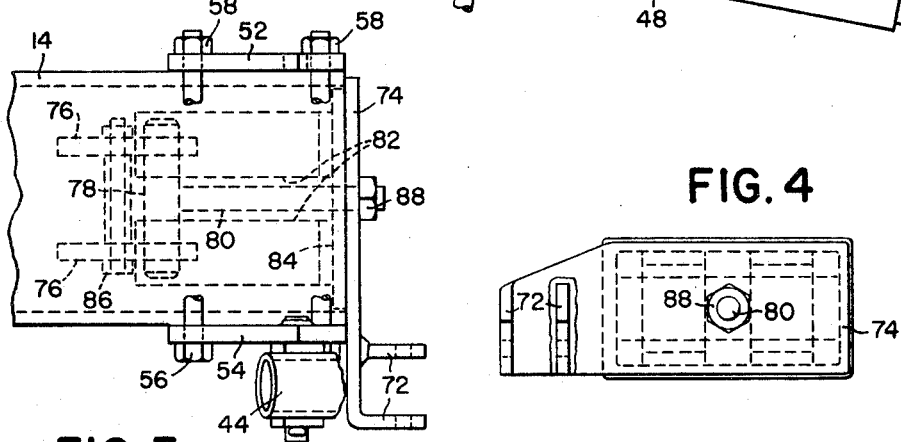
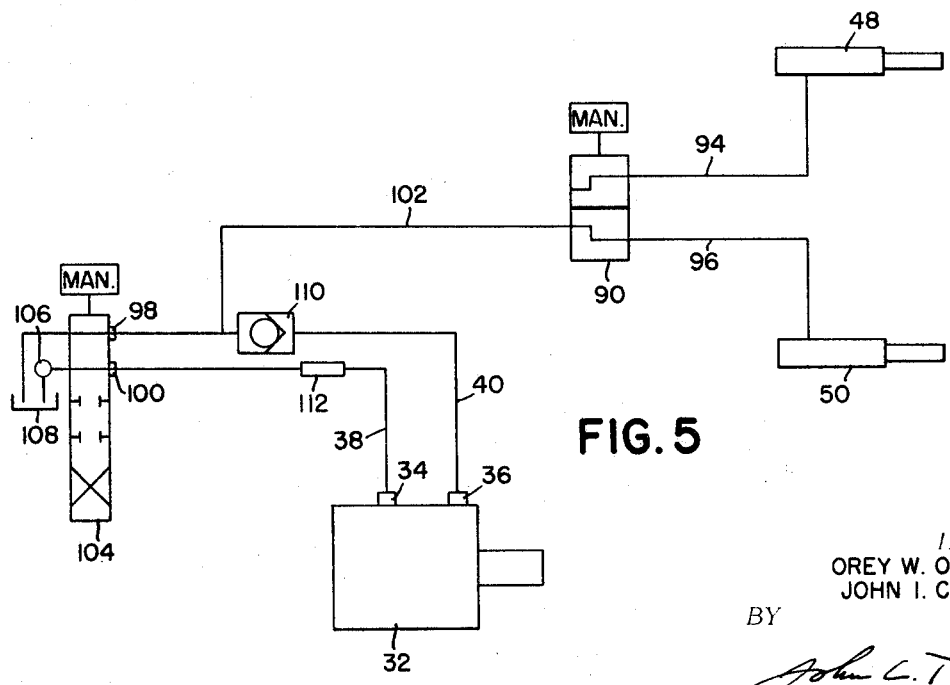
INVENTORS
OREY W. OERMAN
JOHN I. CANTRAL
BY John C. Thompson
ATTORNEY

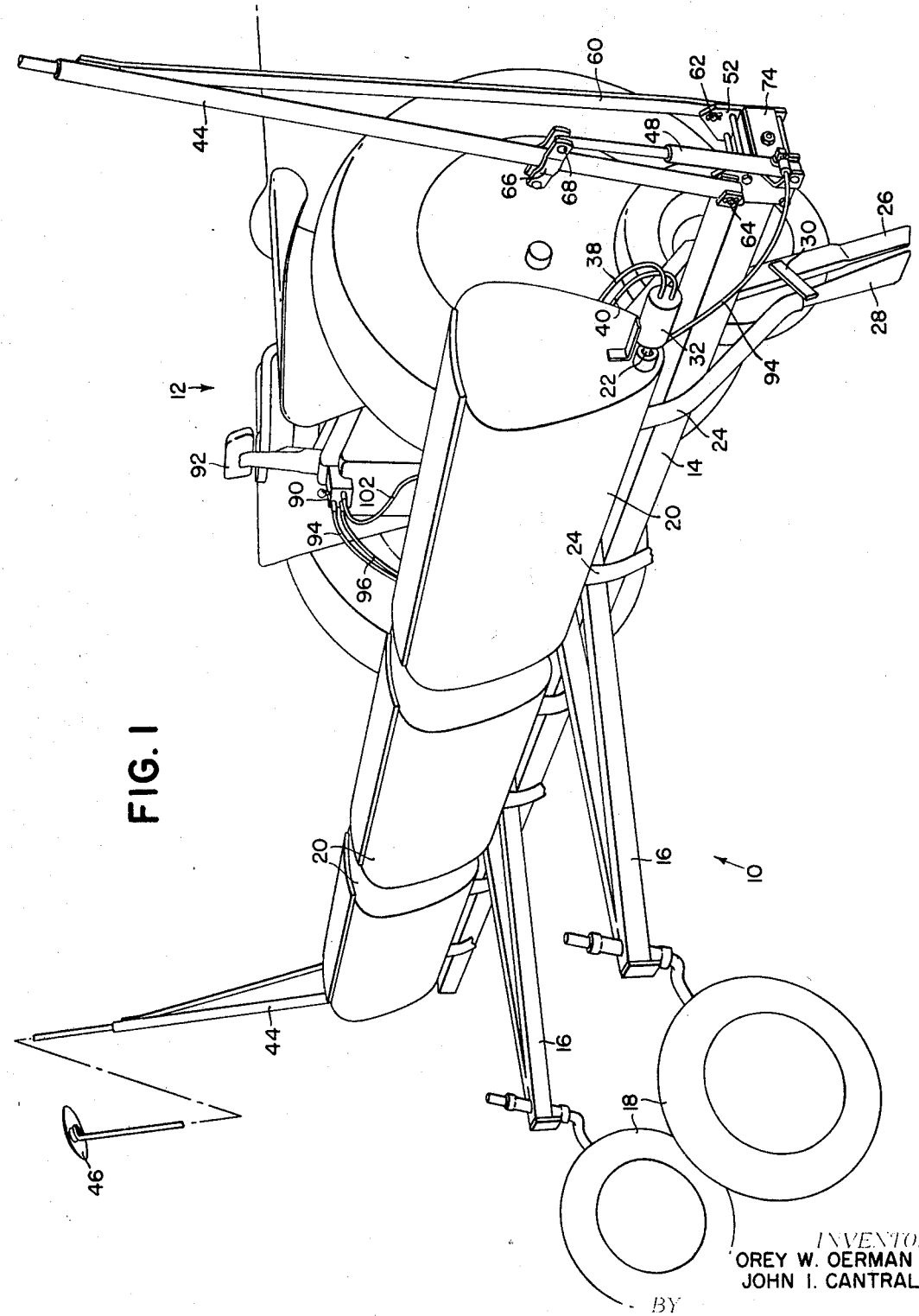

United States Patent Office 3,511,316
Patented May 12, 1970

3,511,316
HYDRAULIC MARKER FOR AGRICULTURAL IMPLEMENTS
Orey William Oerman and John Isaac Cantral, Moline, Ill., assignors to Deere & Company, Moline, Ill., a corporation of Delaware
Filed Jan. 5, 1967, Ser. No. 607,535
Int. Cl. A01b 35/32
U.S. Cl. 172—126                               2 Claims

ABSTRACT OF THE DISCLOSURE

Apparatus for mounting hydraulically actuated row markers on agricultural equipment, including a marker arm mounting bracket securable to the exterior of a hollow toolbar and a cylinder mounting device securable within the toolbar, the marker arm and cylinder being pivotally secured to their respective mounting structures. Also, a hydraulic circuit for operating a hydraulically driven fertilizer attachment in conjunction with the markers in such a fashion that the attachment can only be driven when at least one of the markers is down.

---

It is an object of the present invention to provide a novel mounting structure for a hydraulically actuated marker arm.

It is a further object of the present invention to provide a novel hydraulic circuit for operating a hydraulically driven fertilizer attachment in conjunction with hydraulically actuated markers in such a fashion that the fertilizer attachment can only be driven when at least one of the hydraulic markers is down.

These and other objects and advantages of this invention will be apparent to those skilled in the art after a consideration of the following detailed description, taken in conjunction with the accompanying drawings in which the preferred form of this invention is illustrated.

FIG. 1 is a perspective view of a semi-integral fertilizer distributor secured to a tractor, the fertilizer distributor being provided with hydraulically actuated row markers.

FIGS. 2 and 3 are rear and plan views of the mounting structure for the hydraulically actuated marker arm shown in FIG. 1.

FIG. 4 is an end view of the structure shown in FIGS. 2 and 3 in which the marker support is not illustrated.

FIG. 5 is a schematic view of the hydraulic control circuit which may be used with the hydraulically driven fertilizer distributors and hydraulic marker arms of FIG. 1.

Referring first to FIG. 1, a semi-integral toolbar, indicated generally at 10, is shown secured to a tractor, indicated generally at 12. While not shown in FIG. 1, it should be noted that the toolbar 10 is provided with a forwardly extending hitch frame which may be secured to the lower draft links of at ractor, the lower draft links being vertically movable as is conventional. The forwardly extending hitch frame is rigidly secured to a midportion of the toolbar 14, and rearwardly extending frames 16, which are secured at their forward ends to the toolbar 14, carry at their rear ends castering wheels 18.

While the semi-integral toolbar 10 is suitable for carrying various implements, such as planters and listers, it is shown in FIG. 1 carrying fertilizer distributors which are employed to place fertilizer in rows in the field. The fertilizer distributors include hoppers 20 having augers (not shown) driven at varying speeds through a drive shaft 22 to control the rate at which fertilizer is distributed through outlet hoses 24. The fertilizer hoppers are more fully disclosed in U.S. Pat. 2,906,436. A knife opener 26 is secured to the toolbar 14 and a fertilizer boot 28 is secured to the knife opener 26 by means of a strap 30. The lower end of the hose 24 is secured to the upper end of the boot 28 in a conventional manner. The drive shaft 22 for the fertilizer distributors 20 is secured to a rotary hydraulic motor 32, the inlet and outlet sides 34, 36 being interconnected with the tractor hydraulic system by means of fluid conduits 38 and 40 in a manner which will be more fully described below. Mounted on the right and left ends of the toolbar 14 are marker arms 44 which carry at their outer ends marking disks 46. The marker arms 44 are caused to be raised and lowered by right and left marker cylinders 48 and 50. The marker arm 44 is pivotally secured to the hollow toolbar 14 by means of a marker support which includes front and rear support plates 52, 54, respectively, the plates being secured to each other and to the toolbar by means of bolts 56 and nuts 58. The upper end of the forward plate 52 is apertured and a bracing member 60 is pivotally secured thereto by means of a pivot pin 62. Similarly the upper end of the rear plate 54 is apertured and a pivot pin 64, which is carried by the inner end of the marker arm 44, is disposed within the aperture and secures the arm 44 for pivotal movement. A bracket 66 is secured to an intermediate portion of the marker arm 44 and the outer end or rod end of the cylinder 48 is pivotally secured thereto by means of pivot pin 68.

The inner end or anchor end of the cylinder is secured by means of pivot pin 70 between outwardly extending ears 72 which are secured to cover plate 74. The cover plate 74 covers the open end of the hollow toolbar 14 and is secured to the toolbar by means of an expandable structure including a pair of wedges 76 which are pivotally secured at their forward ends to a cross pin 78 carried at one end of a draw bolt 80. The wedges are disposed within U-shaped members 82 whose bight ends are secured, as by welding, to an apertured cross strap 84 which in turn is secured to the cover plate 74. A spacer pin assembly 86 interconnects the wedges 76 to hold them in their proper spaced apart relation.

To secure the mounting structure for the cylinder 50 within the box tube 14, it is only necessary to insert the structure within the tube until the cover plate 74 abuts the end of the tube and to tighten the nut 88 on the end of the bolt 80 to draw the wedges 76 within the U-shaped members 82 to expand these members into firm engagement with the inner wall of the toolbar 14.

The right and left cylinders 48 and 50 are interconnected by means of right and left fluid conduits 94, 96, respectively, with a manually operated control valve 90 mounted on the tractor to the rear of the tractor seat 92. The manually operated control valve 90 is in turn interconnected with one of a pair of remote outlets 98, 100 on the tractor by means of a fluid line 102.

The operation of the control circuit illustrated in FIG. 5 is as follows: When the control lever 104 on the tractor is held in the position shown in FIG. 5 with the fluid from the tractor pump 106 being discharged through the outlet 100, the hydraulic motor 32 operates and the exhausted fluid is discharged into the tractor reservoir 108 through port 98. With the control lever 90 in the position indicated, the cylinder 50 will be caused to be retracted by the weight of the marker arm 44. When the control lever 104 is moved to its up position, the fluid flow is reversed and the port 98 is interconnected with the pump 106. The check valve 110 will prevent fluid flow from the port 98 through the discharge and input ports 36, 34 on the motor 32. However, the fluid will be able to enter line 102 and lines 94 and 96 to selectively raise the markers 48 and 50.

The advantages of the control circuit illustrated in FIG.

5 are that both the motor 32 and the hydraulically actuated markers can be used on a tractor with only one remote function. Also, a simplified operation is achieved by having only one control 104 to control both the marker and motor, the selector valve 90 only being employed to select that marker which is to be raised or lowered. The speed of the motor 32 is also independent of the marker. Finally, it should be noted that a regulating valve 112 is disposed within the line 38, the regulating valve controlling the rate at which the motor 32 is driven.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A row marker apparatus adapted for use on an open ended tubular tool bar comprising: first mounting frame structure releasably secured to the exterior of the tool bar adjacent one end thereof; second mounting frame structure incluuding a cover plate for the one end of the tool bar, attaching means including expandable means secured to and extending from one side of the cover plate into the one end of the tool bar, the attaching means further including expander means associated with the expandable means and operative to expand the expandable means into firm frictional engagement with inner surfaces of the tool bar; marker arm means; means pivotally securing one end of the marker arm means to one of the frame structures; extensible and retractable hydraulic cylinder means; means pivotally securing one end of the hydraulic cylinder means to the other of the frame structures; and means pivotally interconnecting an intermediate portion of the marker arm means with the other end of the hydraulic cylinder means.

2. The row marker apparatus set forth in claim 1 wherein expandable means includes U-shaped means having its bight portion secured to the cover plate and its legs extending into the interior of the tool bar; and wherein the expander means includes wedge means disposable within the U-shaped means, and force-applying means interconnecting the wedge means with the cover plate and operable to draw the wedge means into the U-shaped means to expand the legs of the U-shaped means into firm engagement with the inner surfaces of the tool bar.

References Cited

UNITED STATES PATENTS

| | | | |
|---|---|---|---|
| 2,130,512 | 9/1938 | Silver | 111—63 |
| 2,584,200 | 2/1952 | Hand et al. | 172—128 |
| 2,795,180 | 6/1957 | Christofferson | 172—128 |
| 2,816,769 | 12/1957 | Noble | 287—114 X |
| 3,158,204 | 11/1964 | Martin | 172—126 |
| 3,250,333 | 5/1966 | Day | 172—126 |

ROBERT E. BAGWILL, Primary Examiner

A. E. KOPECKI, Assistant Examiner

U.S. Cl. X.R.

172—776; 287—114